United States Patent
Yun et al.

(10) Patent No.: US 7,489,312 B2
(45) Date of Patent: Feb. 10, 2009

(54) PIXEL UNIT SCANNING-BASED DISPLAY APPARATUS

(75) Inventors: Sang Kyeong Yun, Gyeonggi-do (KR); Haeng Seok Yang, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 742 days.

(21) Appl. No.: 11/191,169

(22) Filed: Jul. 26, 2005

(65) Prior Publication Data
US 2006/0215267 A1    Sep. 28, 2006

(30) Foreign Application Priority Data
Dec. 2, 2004    (KR) .................... 10-2004-0100579

(51) Int. Cl.
*G06F 3/038* (2006.01)
(52) U.S. Cl. .................... 345/204; 345/32; 359/298
(58) Field of Classification Search .................... 345/32, 345/87, 204; 359/205, 239, 298, 308, 563, 359/568
See application file for complete search history.

(56) References Cited

U.S. PATENT DOCUMENTS

| 5,374,947 | A | 12/1994 | Takahashi et al. | |
| 7,187,487 | B2* | 3/2007 | Przybyla et al. | 359/290 |
| 7,193,761 | B2* | 3/2007 | Yun et al. | 359/216 |
| 7,206,120 | B2* | 4/2007 | Gross et al. | 359/305 |
| 7,233,029 | B2* | 6/2007 | Mochizuki | 257/98 |
| 7,286,764 | B1* | 10/2007 | Trisnadi et al. | 398/84 |
| 7,295,362 | B2* | 11/2007 | Meisburger | 359/290 |
| 2004/0145792 | A1* | 7/2004 | Maeyama et al. | 359/239 |
| 2004/0190099 | A1* | 9/2004 | Yamaguchi | 359/205 |
| 2006/0039053 | A1* | 2/2006 | Yang et al. | 359/204 |

* cited by examiner

*Primary Examiner*—Richard Hjerpe
*Assistant Examiner*—Kimnhung Nguyen
(74) *Attorney, Agent, or Firm*—Christensen O'Connor Johnson Kindness PLLC

(57) ABSTRACT

Disclosed herein is a pixel unit scanning-based display apparatus, in which diffracted beams having a plurality of diffraction orders, formed from a single beam through diffraction, are used to display images in such a manner that each pixel can from a plurality of dots on a screen by vibrating the diffracted light generated in pixels.

8 Claims, 8 Drawing Sheets

PIXEL UNIT SCANNING-BASED DISPLAY APPARATUS

BACKGROUND OF THE INVENTION

1. Field of the Invention

The present invention relates, in general, to a display apparatus and, more particularly, to a pixel unit scanning-based display apparatus, in which diffracted beams having a plurality of diffraction orders, formed from a single beam through diffraction, are used to display images in such a manner that each pixel can form a plurality of dots on a screen by vibrating the diffracted light generated in pixels.

2. Description of the Related Art

Nowadays, printer technology is on the expressway towards high speed, miniaturization, high resolution, and low cost. A typical laser printer employs a laser scanning scheme of scanning laser beams using a laser diode and an f-θ lens.

In order to realize a high speed printer, an image head scheme using a multibeam beamformer has been adopted. In such a scheme, high speed and high quality can be realized, but a high cost is also incurred because it requires a plurality of light sources.

FIG. 1 illustrates an example in which a conventional laser scanning scheme using a single light source and an f-θ lens is used. As shown in FIG. 1, an example of the operation of the laser scanning scheme is described below. If a light beam is generated by a laser diode (LD) 10 in response to a video signal and passes through a collimator lens 11, the light beam is collimated into parallel light and is further converged on a polygon mirror 13 by a cylinder lens 12. While passing through the cylinder lens 12, the parallel light beams are converted into linear light beams parallel to a scanning direction.

Rotating at a constant speed, the polygon mirror 13 driven by a motor deflects the linear light beams incident thereon and scans them in the direction of an f-θ lens 15.

Thereafter, the linear light, scanned at a constant angular velocity by the polygon mirror 13, is deflected by the f-θ lens 15. Simultaneously, aberrations in the deflected linear light are corrected. The linear light beams with corrected aberration are reflected by a bend-back mirror 16 and scanned over a photosensitive drum 17 at a constant velocity due to the constant rotational speed of the polygon mirror 13.

In the laser scanning scheme, it is difficult to attain a high printing speed due to problems with a low switching speed of the laser diode 10 and a low scanning speed of the polygon mirror 13.

For example, an improvement in the scanning speed of the light beam in the laser scanning scheme requires the polygon mirror to rotate at a higher speed, thus requiring a high-speed driving motor. However, a higher speed motor may increase the production cost, and the motor rotating at high speed produces heat, vibration and noise, thus degrading the operational reliability of the apparatus provided therewith.

As another approach to improving the scanning speed of an optical scanning unit, an image head printing scheme, in which a multi-beam beamformer is utilized, has been suggested.

FIG. 2 shows an image head used in a conventional laser scanning scheme. As shown in this figure, an image head 20 has an LED array 21 composed of a sufficient number of LEDs 22 to cover a scanning width of a paper to be printed. In contrast to the laser scanning scheme, this image head printing scheme uses neither a polygon mirror nor an f-θ lens and forms a multibeam which allows all of the content of a line to be printed at the same time, thereby significantly enhancing the printing speed.

However, the image head printing scheme suffers from the disadvantage of having increased production cost because there is a large number of LEDs 22 in the LED array 21 and uniform images are not obtained because of low optical uniformity among LEDs in the array.

SUMMARY OF THE INVENTION

Accordingly, the present invention has been made keeping in mind the above problems occurring in the prior art, and an object of the present invention is to provide a pixel unit scanning-based display apparatus, which is able to form a plurality of dots on a screen from one pixel and thus can be fabricated with relative ease and at low cost and be readily controlled.

In accordance with the present invention, the above object can be accomplished by the provision of a pixel unit scanning-based display apparatus, comprising: an illumination lens unit for scanning a single light beam, incident from a light source unit, in a direction parallel to an optical path of the light beam; a diffractive optical modulator, provided with a plurality of pixels for forming a plurality of dots on a screen, for modulating the single light beam emergent from the illumination lens unit to form diffracted light having a plurality of diffraction orders; a filter unit for selectively passing a predetermined diffracted light beam, having a predetermined diffraction order, therethrough, said predetermined diffracted light beam being selected from among the diffracted light beams formed in the optical modulator; and a pixel unit scanning unit for displaying the diffracted light emergent from the filter unit to form a plurality of dots on a screen in such a manner that a dot is spaced apart from an adjacent dot by a predetermined distance that is sufficient to dispose a plurality of dots therein and for scanning the diffracted light by pixel units to display images.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other objects of the present invention and many attendant advantages of the present invention will be readily appreciated as the same becomes better understood by reference to the following detailed description when considered in connection with the accompanying drawings, in which like reference numerals designate like parts throughout the figures.

DESCRIPTION OF THE PREFERRED EMBODIMENTS

Reference should be made to the drawings to describe the structure of an order separation- and multibeam formation-based printing apparatus using an optical modulator, in detail. A description will be given of a piezoelectric diffractive optical modulator, below, but it should be understood that the principle of the present invention is applicable to transmissive, reflective, or other diffractive optical modulators.

Figure 1:
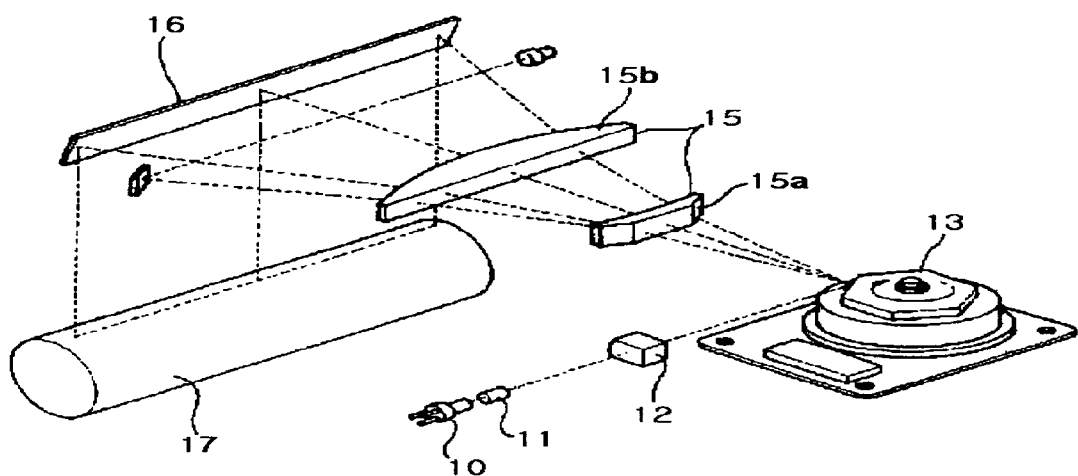
FIG. 1 is a schematic view showing a conventional laser scanning scheme using a single light source and an f-θ lens.
Figure 2:
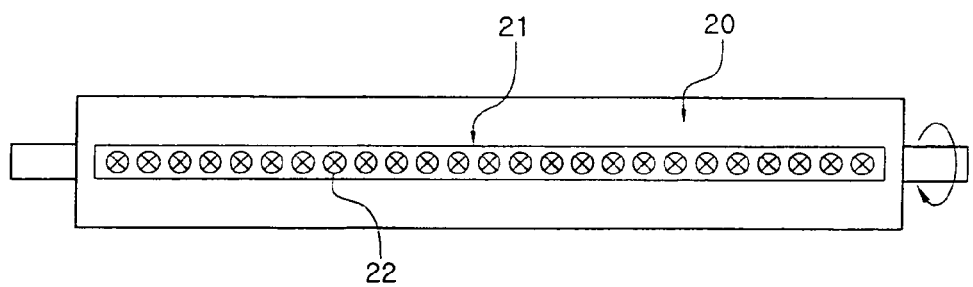
FIG. 2 is a schematic view showing a conventional laser scanning scheme of performing laser scanning using a plurality of beams emitted from an LED array built in an image head.
Figure 3:
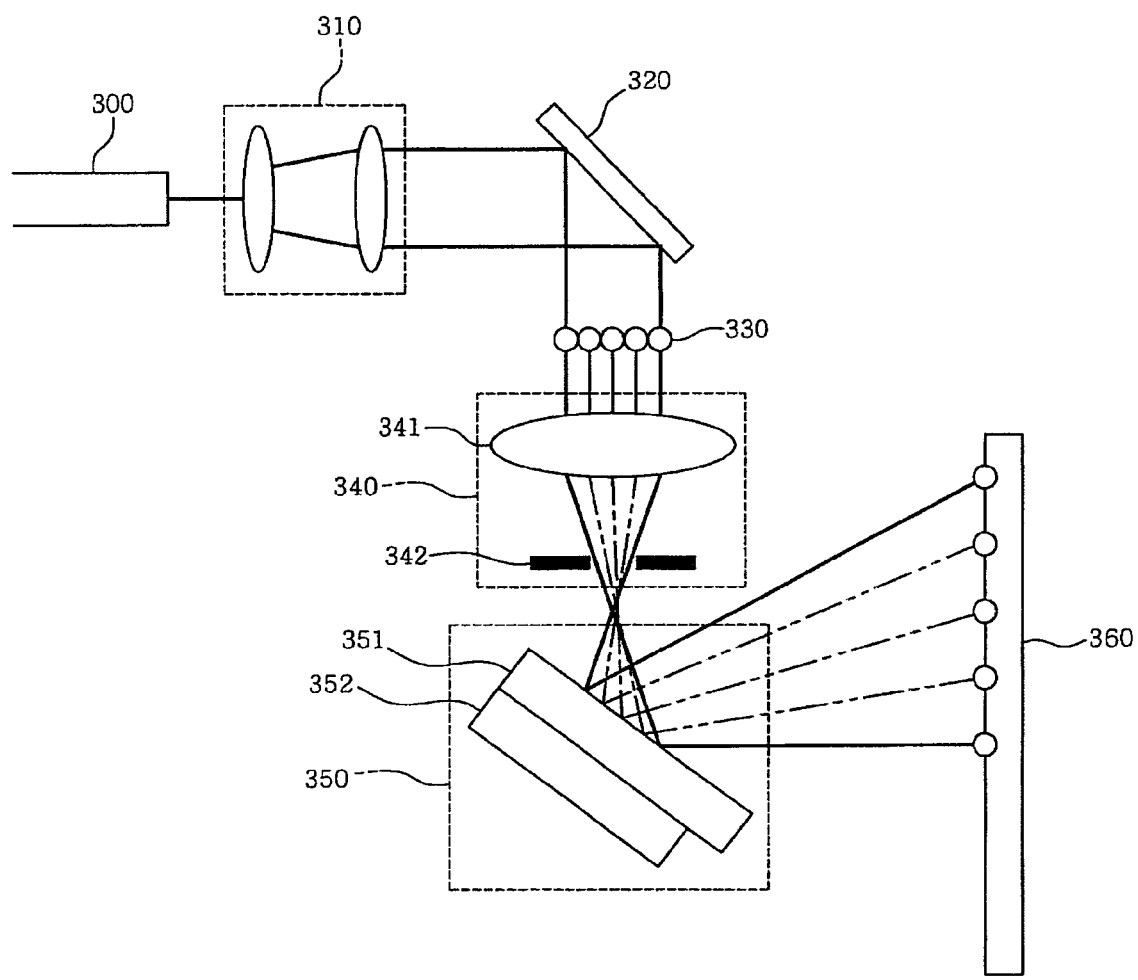
FIG. 3 is a schematic view showing the structure of a pixel unit scanning-based display apparatus using a diffractive optical modulator in accordance with the present invention.

With reference to FIG. 3, there is a diagram that shows the structure of a pixel unit scanning-based display apparatus using an optical modulator, in accordance with an embodiment of the present invention.

The pixel unit scanning-based display apparatus using an optical modulator, as seen in FIG. 3, comprises a light source 300, an illumination lens 310, a diffractive optical modulator 320, a micromirror array 330, a filter unit 340, a pixel unit scanning unit 350, and a screen 360.

The light source 300 is a single light source composed of a laser diode emitting light having a predetermined wavelength. The illumination lens unit converts the light beam emitted from the light source 300 into linear parallel light, which is then incident on the diffractive optical modulator 320.

Figure 4A:
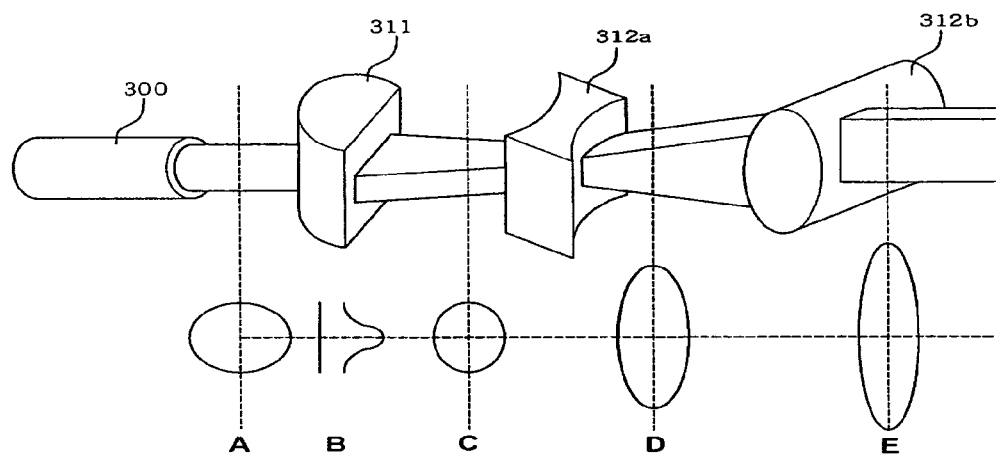
FIGS. 4A~4C shows optical paths of a light beam passing through an illumination lens unit used in the pixel unit scanning-based display apparatus of FIG. 3 in perspective view, plan view, and side cross sectional view.
Figure 4B:
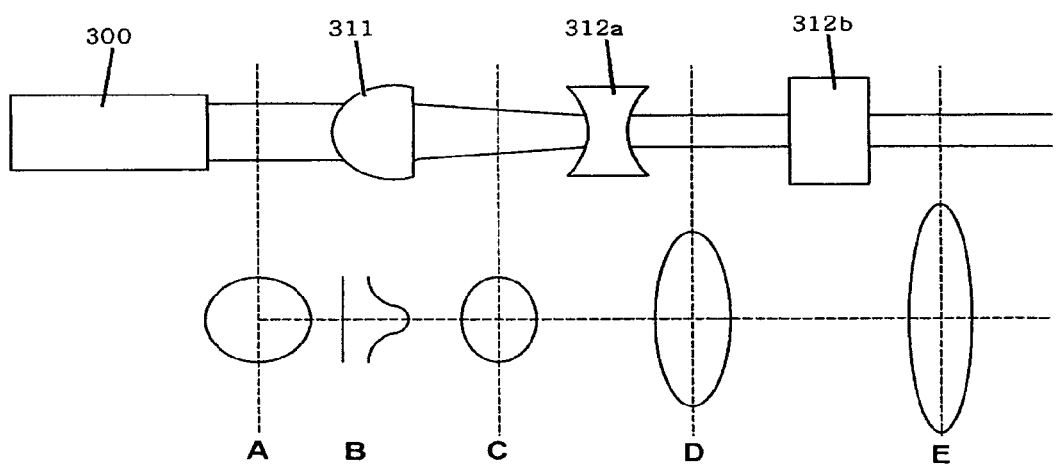
Figure 4C:
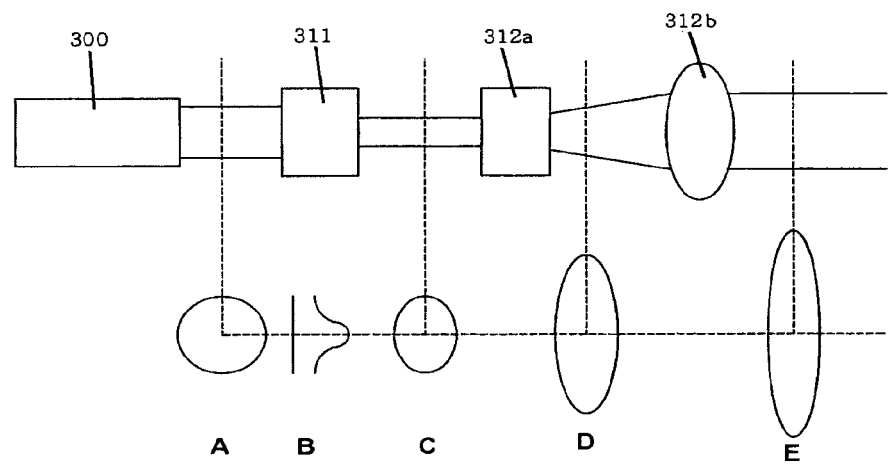

A cross section of the light emerging from the light source 300 is depicted in (A) of FIGS. 4A~4C. As seen, the light emerging from the light source 300 has a circular cross section, while its intensity profile forms a Gaussian distribution as seen in (B) of FIGS. 4A~4C.

Composed of a cylinder lens 311 and a collimator lens 312, the illumination lens unit 310 converts the incident light into linear parallel light having an elliptical cross section.

Through the cylinder lens 311 and the collimator lens 312, the parallel beam incident from the light source 300 is made linear in a direction parallel to the optical path direction, and is then made incident on the diffractive optical modulator 320, aligned parallel to the optical path. When emerging out of the cylinder lens 311, the incident parallel light beam is converted into a linear light beam parallel to the direction of the optical path, as shown in (C) of FIGS. 4A~4C.

Before being incident on the diffractive optical modulator 320, the linear light beam transmitted through the cylinder lens 311 is collimated into a parallel light beam by the collimator lens 312.

In an embodiment of the present invention, the collimator lens 312 may comprise a concave lens 312$a$ and a convex lens 312$b$, as seen in FIGS. 4A~4C.

The concave lens 312$a$ allows the linear beam to diverge up and down and be incident on the convex lens 312$b$ as seen in (D) of FIGS. 4A~4C. After passing through the convex lens 312$b$, a parallel beam emerges, as seen in (E) of FIGS. 4A~4C.

Figure 5:
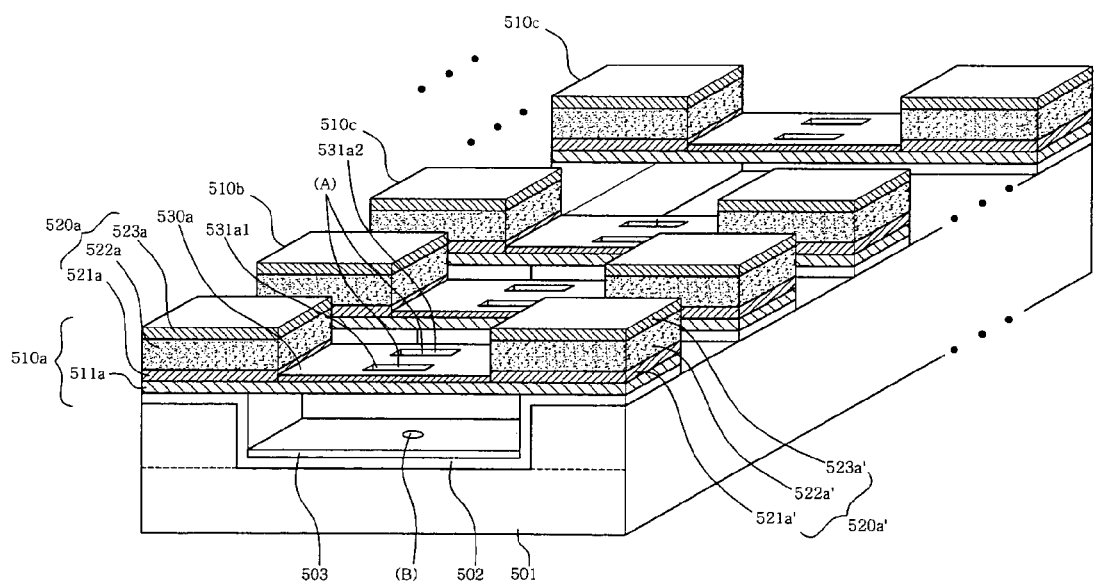
FIG. 5 is a perspective view showing a diffractive optical modulator used in the pixel unit scanning-based display apparatus of FIG. 3.

Thereafter, the diffractive optical modulator 320 diffracts the light incident from the illumination lens unit 310 to produce diffracted light having a plurality of orders. Various types of diffractive modulators may be used for this purpose, an example of which is an open hole-based diffractive modulator depicted in FIG. 5.

As seen in this figure, the open-hole based diffractive optical modulator comprises a base substrate 501, an insulation layer 502, a lower micromirror 503, and a plurality of elements 510$a$~510$n$. Although separate from the lower micromirror in this figure, the insulation layer, if reflective, may itself be used as the micromirror.

The base substrate 501 has a depression, formed in a middle portion, for providing air spaces for the elements 510$a$~510$n$, with the insulation layer 502 formed over predetermined areas of the upper surface thereof. The lower micromirror 503 is deposited on the insulation layer 502 within the depression. On each of the opposite banks located beside the depression, an array of elements 510$a$~50$n$ is built. The base substrate 501$a$ may be made from a single material selected from among Si, $Al_2O_3$, $ZrO_2$, quartz, $SiO_2$, etc., or may be divided into two parts having materials different from each other (on the basis of the dotted line represented in the figure).

Deposited on the base substrate 501, the micromirror 503 functions to reflect an incident light beam for the purpose of diffraction. The lower micromirror 503 is made from metal such as Al, Pt, Cr, Ag, etc.

Because the elements have the same structure, only one of them will be described below. As seen, the element 510$a$ looks like a ribbon and has a lower support 511$a$ which spans the depression over a set of opposite banks, at its lowest layer, so that the element 510$a$ is spaced apart from the depression of the base substrate 501 at a middle portion.

Piezoelectric cells 520$a$ and 520$a'$ are respectively formed on opposite side portions of the lower support 511$a$, and contract or expand to provide the drive power of the element 510$a$.

As a material for the lower support 511$a$, Si oxides, such as $SiO_2$, Si nitrides, such as $(Si_3N_4)$, and Si carbides may be used. Also, a ceramic substrate, such as Si, $ZrO_2$ or $Al_2O_3$, may be used as the lower support 511$a$. Optionally, the lower support 511$a$ may be omitted.

Each of the piezoelectric cells 520$a$ and 520$a'$ disposed on respective side portions of the lower support includes a lower electrode layer 521$a$, 521$a'$ and an upper electrode layer 523$a$ and 523$a'$ with a piezoelectric layer 522$a$, 522$a'$ interposed therebetween. When an external electrical field is applied across the lower electrode layer 521$a$, 521$a'$ and the upper electrode layer 523$a$, 523$a'$, the piezoelectric layer 522$a$, 522$a'$ contracts and expands in response to the drive power applied, to cause motion of the lower support 511$a$ in a direction perpendicular to its plane.

For the formation of the electrodes 521$a$, 521$a'$, 523$a$, 523$a'$, a material selected from among Pt, Ta/Pt, Ni, Au, Al, RuO2, etc. may deposited in a thickness from 0.01 to 3 μm by a dry-type method such as sputtering, evaporation, etc.

In each element, an upper micromirror 530$a$ provided with a plurality of open holes 531$a$1, 531$a$2 is deposited on a middle portion of the lower support 511$a$. The open hole may have any shape. For example, it may be a rectangle, a circle, or an oval, or any other curved shape, with the preference for a rectangle. The lower support, if formed of a light reflecting material, need not have an upper micromirror deposited thereon if it can function as a mirror itself.

Upon passing through the open holes 531$a$1, 521$a$2 of the upper micromirror 530$a$, a light beam is diffracted and incident on corresponding areas of the lower micromirror 503, whereby a combination of the lower micromirror 503 and the upper micromirror 530a can form a pixel.

For instance, a portion A of the upper micromirror 530a, in which the open holes 531a1, 531a2 are formed, can form a pixel, in combination with a portion B of the lower micromirror 503. When the distance between the upper micromirror 530a and the lower micromirror 503 is odd number multiples of λ/4, the diffractive light beam has maximum intensity.

The diffractive optical modulator 320 functions to diffract a linear light beam incident thereon and allow the diffracted light beam to be incident on the micromirror array 330.

Figure 6:
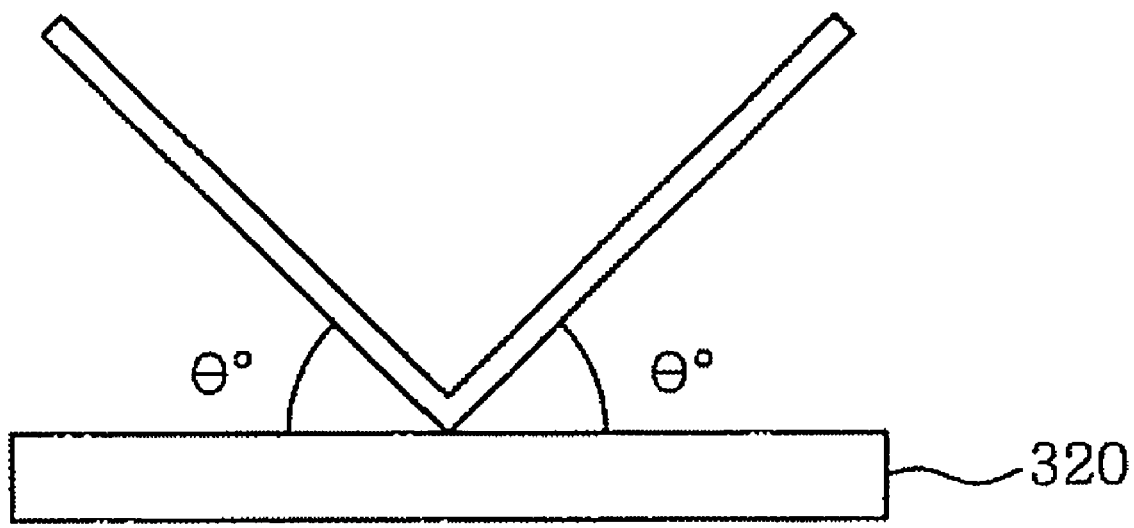
FIG. 6 is a schematic view illustrating the angle of reflection of the diffractive modulator of FIG. 5.

When reflected in the diffractive optical modulator, the diffracted light beam has the angle of reflection depicted in FIG. 6. As seen, the angle of incidence of the diffracted light beam is equal to the angle of reflection. That is, when the light beam is incident at an angle of θ degrees on the optical modulator 320, it is reflected at an angle of θ degrees.

Figure 7:
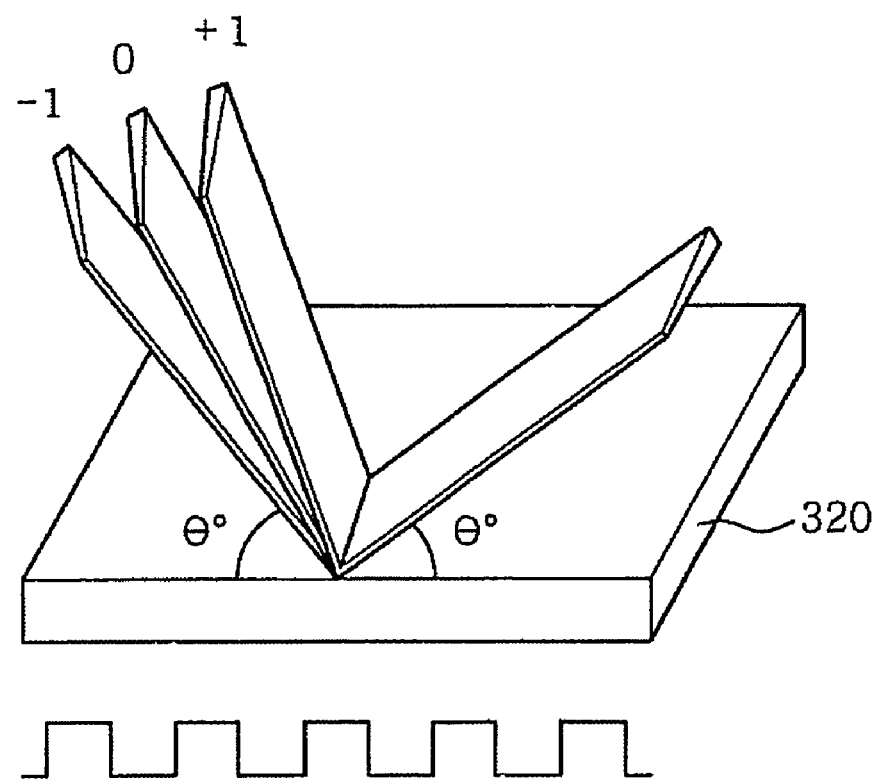
FIG. 7 is a schematic view showing diffracted light beams formed by the diffractive optical modulator of FIG. 5.

Next, referring to FIG. 7, the diffracted light that is generated by the diffractive optical modulator 320 is shown. Acting as a diffraction grating, the diffractive optical modulator generates $0^{th}$ and $\pm 1^{st}$ order diffraction beams in the periodical direction of the grating. As seen, light incident on the diffractive optical modulator is split into light beams having a plurality of diffraction orders.

Figure 8A:
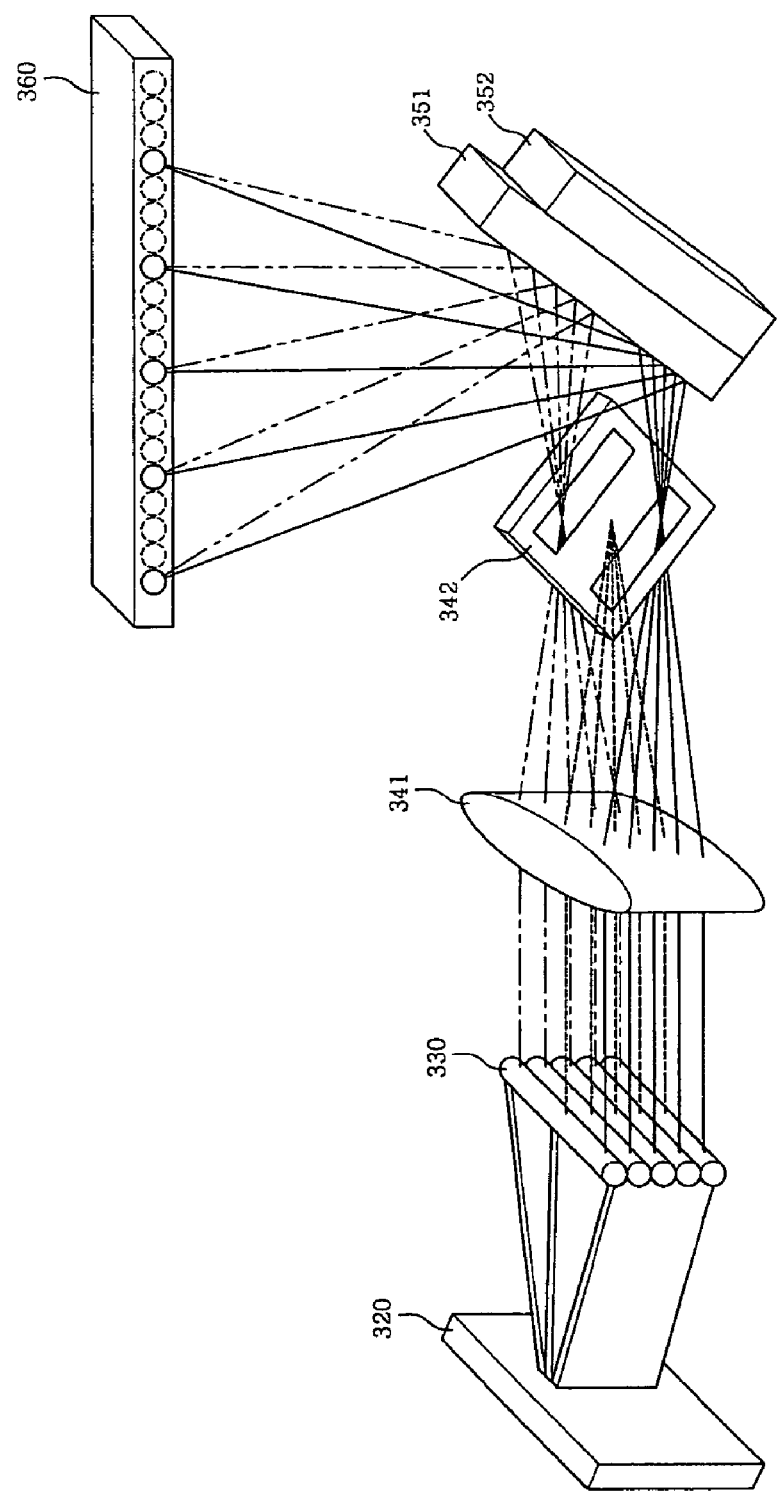
FIGS. 8A and 8B are schematic views showing the optical paths of light beams traveling from the diffractive optical modulator of FIG. 5 to a screen.
Figure 8B:
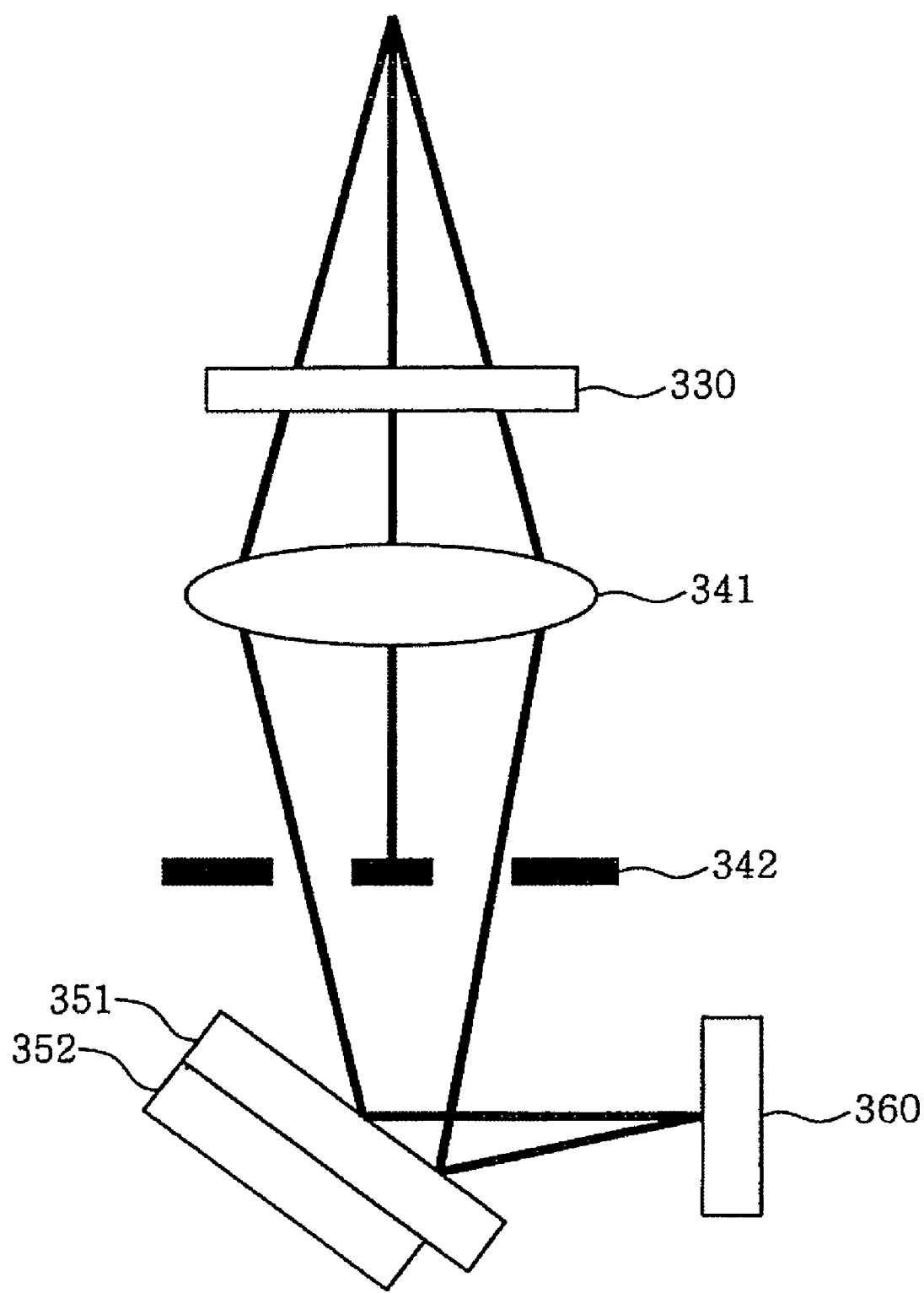

The micromirror array 330, an arrangement of a plurality of micromirrors, deflects the light beams generated in each pixel of the diffractive optical modulator 320 so as to converge the light beams on the filter unit 340. In this way, a diffracted light beam generated in each pixel can form a dot which is not blurry but clear and intense when it is projected on a screen. The optical path of the light beams passing through the micromirror array 330 is shown in FIGS. 8A and 8B. After being converged by the micromirror array, the diffracted light generated is incident on a Fourier lens 341 of the filter unit 340.

As seen in FIG. 8A, the Fourier lens 341, serving as an order-separating lens, makes the diffracted light beams of each diffraction order narrow in a vertical direction. Accordingly, a filter 342, if located at the position where the light beams are converged vertically, can readily filter diffracted light beams having predetermined orders, as seen in FIG. 8A. In this embodiment, the Fourier lens 341, in combination with the filter 342, allows only $+1^{st}$-order and $-1^{st}$-order diffracted light beams to pass therethrough and to be projected on a screen 360 at the same time, as seen in FIG. 8B.

In this regard, the filter unit 340 is preferably comprised of a Fourier lens 341 and a spatial filter 342. While the Fourier lens 341 separates the diffracted light incident thereon according to diffraction order, the spatial filter 341 which has a plurality of spatially separated slits passes only diffracted light having desired orders therethrough.

With reference to FIGS. 8A and 8B, as described above, the Fourier lens 341 converts the light incident thereon into converged emergent light.

The pixel unit scanning unit 350 comprises a galvano mirror 351 and a vibration means 352. After reflecting the diffracted light beams traveling through the spatial filter 342 onto the screen, the galvano mirror 351 scans the light beams by pixel unit and allows one pixel to form several dots on the screen. That is, as shown in FIG. 3, the galvano mirror 351 focuses dots formed in each pixel of the diffractive optical modulator 320 on the screen in such a manner as to separate them from one another (here, only 5 pixels are described for convenience's sake, but it is obvious that more pixels are possible).

As the galvano mirror 351 is moved from side to side by the vibration means 352, the dots on the screen 360 are correspondingly moved in the same direction. As a result, 5 pixels can form 15 dots, as shown in FIG. 8a.

In the present invention, diffracted beams are concentrated on a photosensitive surface of the screen 360 not densely but in a separated manner such that dots are spaced apart from one another. For example, as seen in FIG. 8a, dots are formed with sufficient distance between two adjacent dots to dispose three more dots therein.

When the vibration means 352 vibrates to move the galvano mirror 351 sequentially to the right, the positions of the dots are sequentially shifted in the same direction.

Figure 9:
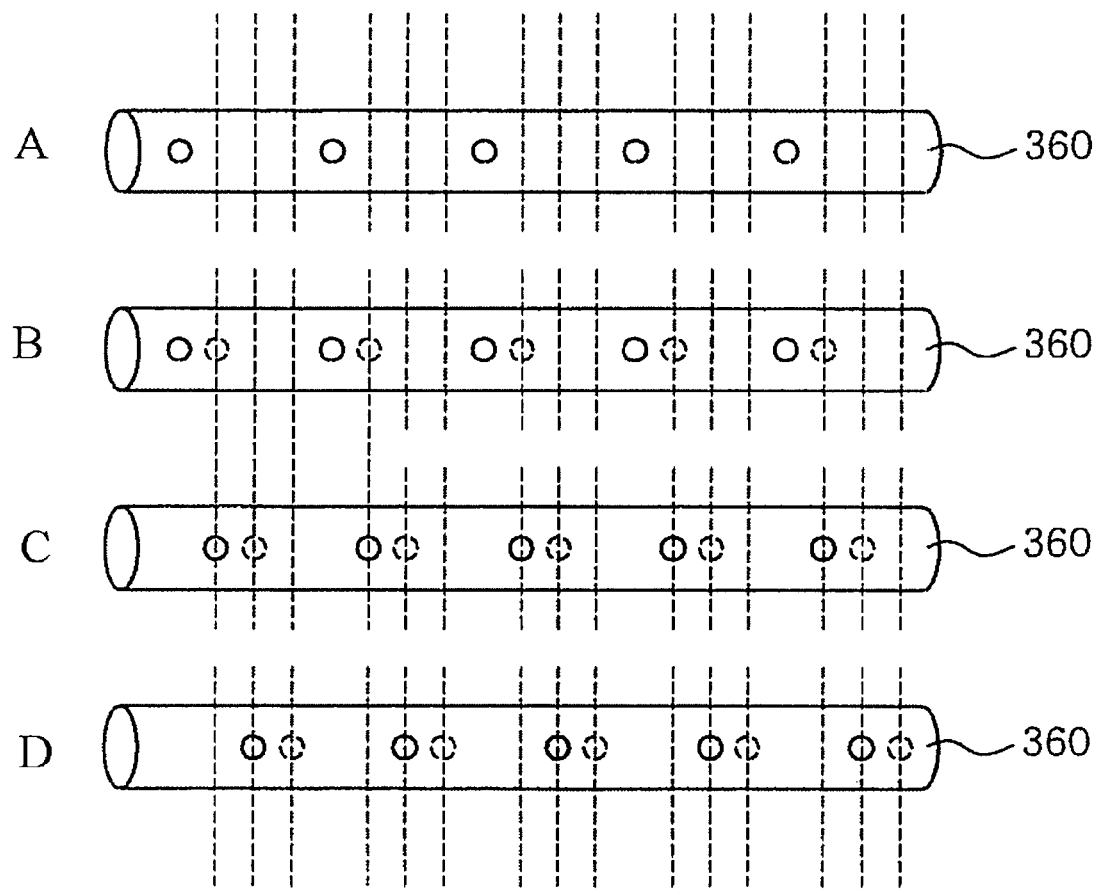
FIG. 9 is a schematic view illustrating a pixel unit scanning-based scheme for scanning dots on a screen.

Initially, as shown in (A) of FIG. 9, dots are formed at predetermined positions far enough apart from each other to dispose 3 pixels therebetween. Next, the galvano mirror 352 is moved rightwards by vibration of the vibration means 352, so as to shift the dots in the same direction as seen in (B) of FIG. 9. Then, another vibration of the vibration means 352 forms the dots on the next positions to the right, as seen in (C) of FIG. 9. Finally, the dots can occupy the predetermined last positions as the vibration means 352 further operates, as seen in (D) of FIG. 9, so as to cover all needed pixels.

In this way, the effect of, for example, 4,000 pixels can be attained using only 1,000 pixels by taking advantage of the vibration means.

As described hereinbefore, the scanning apparatus using a diffractive optical modulator in accordance with the present invention makes it possible to form a large number of dots using a small number of pixels and thus can be fabricated with relative ease.

Also, thanks to having a small number of pixels, the scanning apparatus of the present invention can be readily controlled.

Another advantage attributed to the small number of pixels is cost reduction.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed:

1. A pixel unit scanning-based display apparatus, comprising:

an illumination lens unit for scanning a single light beam incident from a light source unit, in a horizontal direction with respect to an optical path of the light beam;

a diffractive optical modulator, provided with a plurality of pixels for forming a plurality of dots on a screen, for modulating the single light beam emergent from the illumination lens unit to form diffracted light having a plurality of diffraction orders;

a filter unit for selectively passing a predetermined diffracted light beam, having a predetermined diffraction order, therethrough, said predetermined diffracted light beam being selected from among the diffracted light beams formed in the optical modulator; and a pixel unit scanning unit for displaying the diffracted light emergent from the filter unit to form a plurality of dots on a screen in such a manner that a dot is spaced apart from an adjacent dot by a predetermined distance that is sufficient to dispose a plurality of dots therein, and for scanning the diffracted light by pixel unit to display images.

2. The pixel unit scanning-based display apparatus as set forth in claim 1, wherein the filter unit comprises:

a Fourier lens for focusing the diffracted light having the plurality of diffraction orders, generated in the diffractive optical modulator, according to diffraction order; and a filter for selectively passing a predetermined diffracted light beam, having a predetermined diffraction order, therethrough, said predetermined diffracted light beam being selected from among the diffracted light beams concentrated by the Fourier lens.

3. The pixel unit-scanning display apparatus as set forth in claim 1, wherein the pixel unit scanning unit comprises:

a galvano mirror for displaying the diffracted light emergent from the filter unit to form a plurality of dots on a screen in such a manner that a dot is spaced apart from an adjacent dot by a predetermined distance that is sufficient to dispose a plurality of dots therein; and a vibration means for periodically vibrating the galvano mirror such that the galvano mirror scans the diffracted light by pixel units to display images on the screen.

4. The pixel unit scanning-based display apparatus as set forth in claim 1, further comprising a micromirror array, arranged immediately after the diffractive optical modulator, for concentrating the diffracted light generated in the diffractive optical modulator, by dot unit.

5. The pixel unit scanning-based display apparatus as set forth in claim 1, wherein the illumination lens unit comprises:

a cylinder lens for making the light emitted from the light source linear; and a collimator lens for parallelizing the linear light passing through the cylinder lens.

6. The pixel unit scanning-based display apparatus as set forth in claim 5, wherein the illumination lens unit comprises:

a cylinder lens for making the light emitted from the light source linear; and a collimator lens for parallelizing the linear light passing through the cylinder lens.

7. The pixel unit-scanning display apparatus as set forth in claim 5, wherein the filter unit comprises:

a Fourier lens for focusing the diffracted light having the plurality of diffraction orders, generated in the diffractive optical modulator, according to diffraction order; and a filter for selectively passing a predetermined diffracted light beam, having a predetermined diffraction order, therethrough, said predetermined diffracted light beam being selected from among the diffracted light beams concentrated by the Fourier lens.

8. The pixel unit-scanning display apparatus as set forth in claim 5, wherein the pixel unit scanning unit comprises:

a galvano mirror for displaying the diffracted light emergent from the filter unit to form a plurality of dots on a screen in such a manner that a dot is spaced apart from an adjacent dot by a predetermined distance that is sufficient to dispose a plurality of dots therein; and a vibration means for periodically vibrating the galvano mirror such that the galvano mirror scans the diffracted light by pixel units to display images on the screen.

* * * * *